United States Patent [19]

Shimizu

[11] Patent Number: 5,276,518
[45] Date of Patent: Jan. 4, 1994

[54] STATION SELECTOR WITH CHANNEL SELECTION MEMORIES TO BE ASSIGNED IN THE MARKETPLACE AND/OR FACTORY

[75] Inventor: Yoshikazu Shimizu, Osaka, Japan

[73] Assignee: Matsushita Electric Industrial Co., Ltd., Osaka, Japan

[21] Appl. No.: 719,817

[22] Filed: Jun. 24, 1991

[30] Foreign Application Priority Data

Jun. 29, 1990 [JP] Japan .................................. 2-173423

[51] Int. Cl.$^5$ ............................................. H04N 5/50
[52] U.S. Cl. .................................. 358/191.1; 358/10; 455/186.1; 455/186.2
[58] Field of Search ................ 358/191.1, 192.1, 193.1, 358/195.1, 10, 139; 455/186.1, 186.2, 185; H04N 17/04, 5/50; H04B 1/16, 2/26

[56] References Cited

U.S. PATENT DOCUMENTS

| | | | |
|---|---|---|---|
| 4,355,415 | 10/1982 | George et al. | 455/186.1 |
| 4,593,414 | 6/1986 | Koyanagi | 455/186.2 |
| 4,677,685 | 6/1987 | Kurisu | 455/186.1 |
| 4,731,654 | 3/1988 | Itabashi et al. | 455/186.2 |
| 4,837,627 | 6/1989 | Mengel | 358/191.1 |
| 5,001,775 | 3/1991 | Hayashi et al. | 455/186.1 |
| 5,077,828 | 12/1991 | Waldroup | 455/34.1 |
| 5,125,106 | 6/1992 | Kato | 358/191.1 |
| 5,127,795 | 6/1992 | Brusaw | 385/191.1 |

FOREIGN PATENT DOCUMENTS

| | | | |
|---|---|---|---|
| 58-172011 | 10/1983 | Japan | H04N 17/04 |
| 61-009708 | 1/1986 | Japan . | |
| 61-32613 | 2/1986 | Japan . | |
| 2-0364032 | 2/1990 | Japan . | |
| 3-025590 | 2/1991 | Japan . | |

Primary Examiner—James J. Groody
Assistant Examiner—John W. Miller
Attorney, Agent, or Firm—Stevens, Davis, Miller & Mosher

[57] ABSTRACT

A station selector of the present invention is provided with such a construction that position memories for station selection are changed over depending on a factory state and a market state using as memories position memories exclusive for a factory and exclusive for a market. According to the present invention, appropriate station selecting data are stored in position memories both at a factory and in a market place, and troublesome rewriting is not required at the time of shipment from a factory.

4 Claims, 1 Drawing Sheet

STATION SELECTOR WITH CHANNEL SELECTION MEMORIES TO BE ASSIGNED IN THE MARKETPLACE AND/OR FACTORY

BACKGROUND OF THE INVENTION

1. Field of the Invention

The present invention relates to a station selector used for a color television receiver and the like, which is made capable of storing a position exclusive for a factory at the time of production at the factory.

2. Description of the Related Art

In a conventional station selector, a memory exclusive for a factory for storing data used for checking when it is checked whether station selecting operation is being performed properly or not at the time of production is not provided, and adjustment and has been performed at the factory by utilizing a memory exclusive for a market to be used in practice by an operator in station selecting operation after shipment of products.

A conventional station selector will be described hereafter with reference to the drawings.

FIG. 1 is a block diagram of a conventional station selector. In FIG. 1, a numeral 12 denotes a station selection indication input circuit, 16 thru 18 denote position memories exclusive for a market which store n pieces of (n: integer 1 and above) station selecting data (frequency data) for every position, 15 denotes a memory control circuit for write and read of station selecting data in each memory by controlling above-mentioned position memories 16 thru 18, 14 denotes a tuner for obtaining a picture image of a television receiver in practice, and 13 denotes a station selection control circuit for sending data obtained by controlling above-mentioned memory control circuit in accordance with a command of above-mentioned station selection indication input circuit 12 to the tuner 14.

The operation of a conventional station selector thus constructed will be described with reference to FIG. 1.

In FIG. 1, when a position selecting command arrives at the station selection indication input circuit 12 (selecting means not shown), the memory control circuit 15 reads station selecting data at a position 2 from a position memory 2 in accordance with the input thereof if the command is to select the position 2, the station selection control circuit 13 sends station selecting data thereof to the tuner 14, and a specific channel is selected in the tuner 14 from television broadcasting which is on the air for adjustment at the factory based on the station selecting data so that a selected channel is on a television receiver.

In above-described operation, however, electric wave presents bad electric wave condition sometimes in relation to factory facilities, which is unsuitable for adjustment in the factory with position data in an actual shipping state (data for selecting respective channels on the air in the market). Thus, it is required to write exclusive position data for adjusting in the factory (data for selecting respective channels of television broadcasting which is on the air for the purpose of adjustment at the factory only). However, when shipment is made with position data in the factory remaining as it is, troubles may be caused in the actual market this time (for example, because there are also station selecting data for a channel which is not broadcast in an ordinary market). In order to make up for such a contradiction, rewriting to position data for selecting television broadcasting channels on the air practically in the market has been heretofore made again at the time of shipment. Otherwise, position memories more than required or station selecting data for channels which are not in use (not in the air) depending on the market to which shipment is made have been prepared in the factory.

SUMMARY OF THE INVENTION

It is an object of the present invention to provide in order to solve above-mentioned problems a station selector in which it is not required to rewrite at the time of shipment from a factory by separating position memory at a factory and position memory in a market from each other, and it is not required to prepare additional position memories.

In order to solve above-mentioned problems, a station selector of the present invention is provided with such a construction that position memories for station selection are changed over depending on a factory state or a market state using position memories exclusive for a factory and exclusive for a market as memories.

According to the present invention, appropriate station selecting data are stored in position memories either at a factory or in a market and troublesome rewriting is no longer required at the time of shipment from the factory.

DESCRIPTION OF THE PREFERRED EMBODIMENT

An embodiment of a station selector of the present invention will be described hereafter with reference to the drawings.

Figure 1:
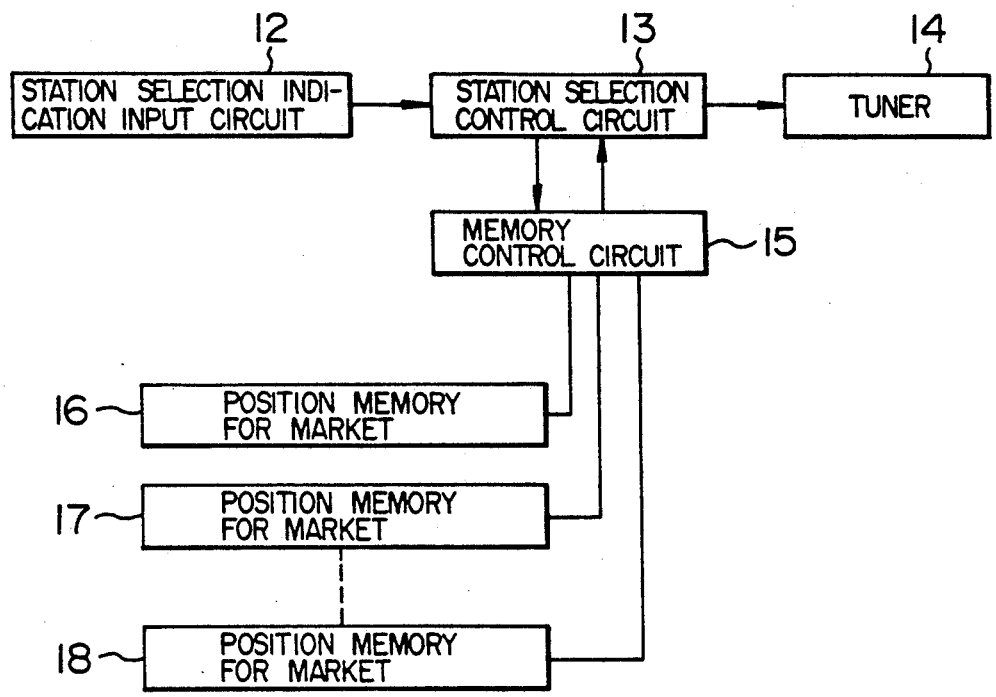
FIG. 1 is a block diagram of a conventional station selector.
Figure 2:
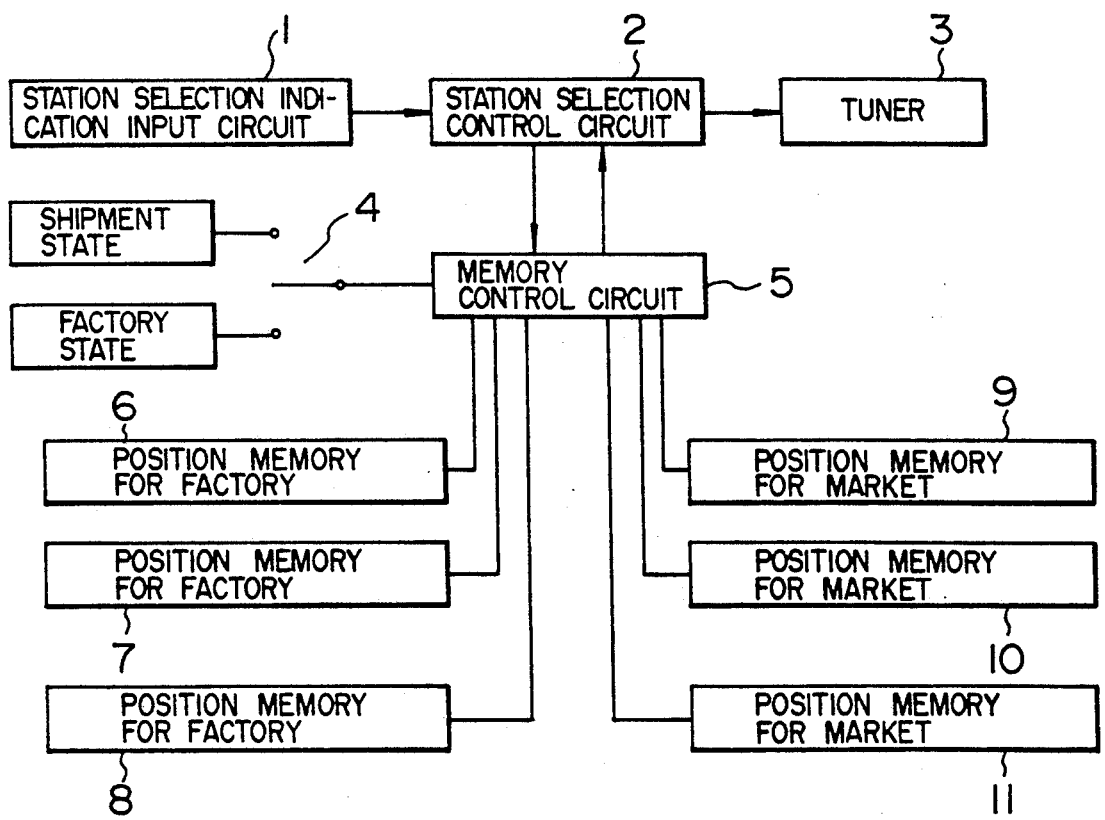
FIG. 2 is a block diagram showing an embodiment of a station selector of the present invention.

FIG. 2 is a block diagram of a station selector of the present invention.

In FIG. 2, a numeral 1 denotes a station selection indication input circuit, 6 thru 8 denote position memories exclusive for a factory in which n pieces of (n: integer 1 and more) station selecting data for adjustment are stored at every position, 9 thru 11 denote position memories exclusive for a market in which n pieces of station selecting data for selecting television broadcasting on the air in the market actually, 4 denotes a state change-over switch for changing a factory state (position memory for a factory) over to and from a shipment state (position memory for a market), 5 denotes a memory control circuit which controls either above-mentioned position memories 6 thru 8 or above-mentioned position memories 9 thru 11 by means of the state change-over switch so as to write and read the data, 3 denotes a tuner for obtaining a picture image of a television receiver in practice, and 2 denotes a station selection control circuit which sends data obtained by controlling the memory control circuit 5 in accordance with the command of the station selection indication input circuit 1 to the tuner 14.

A station selector thus constructed will be described with reference to FIG. 2.

In FIG. 2, when a position selection command arrives at the station selection indication input circuit 1 (selecting means not shown), the memory control circuit 5 reads station selecting data at the position 2 (out of positions 1 through n as identified above) for adjusting at a factory from a position memory 7 exclusive for a factory in accordance with the input of the position selection command if the command contents are to select the position 2 and the state change-over switch 4 is in the factory state, the station selection control circuit 2 sends the station selecting data to a tuner 3, and a channel selected as a television receiver is on the screen by means of the tuner 3 based on the relevant station selecting data.

Similarly, when the selection command of the position 2 arrives at a station selection indication input circuit 1 and the state change-over switch 4 is in the market state, the memory control circuit 5 reads the station selecting data on the air in the market actually, the station selection control circuit 2 sends the station selecting data to the tuner 3, and the channel selected as a television receiver is on the screen.

In such a manner, station selecting data which are different even for station selecting indication of the same position depending on the factory state and the market state are read, thus making station selecting operation required for respective station selecting data possible.

Further, when station selecting data are written in respective position memories exclusive for a factory and exclusive for a market, the data are similarly written in position memories selected among position memories 6 to 8 exclusive for a factory and position memories 9 to 11 exclusive for a market depending on the state of the state change-over switch 4.

Besides, the number of position memories exclusive for a factory and the number of position memories exclusive for a market have been identical to each other in the present embodiment. However, it is not necessary to prepare the same quantity in case position data for adjustment used at the factory is few in number, but it is only required to read and write in position memories exclusive for a market (corresponding to channels which are not in use usually in the market place) which are in excess when there is no position memory corresponding to the time when the state change-over switch 4 is in a factory state for instance. The same is applied to a case when the factory state requires more positions on the contrary.

As described above, the present invention has such an excellent effect that appropriate station selecting data are stored in position memories both at a factory and in a market place, and troublesome rewriting is no longer required at the time of shipment from the factory.

I claim:

1. A station selector, comprising:
position memories exclusive for a factory in which station selecting data for adjustment at a factory are written;
position memories exclusive for a market in which station selecting data for selecting television broadcasting on the air in a market place are stored; and
switch means which changes over said two types of position memories depending on a factory state and a shipment state.

2. A station selector, comprising:
position memories exclusive for a factory in which station selecting data for adjustment for the purpose of checking at a factory whether station selecting operation is performed properly or not are written;
position memories exclusive for a market in which station selecting data for selecting television broadcasting on the air actually in the market place are written;
a state change-over switch which changes over a factory state to and from a shipment state;
a memory control circuit which reads and writes said two types of memories in accordance with the change-over operation of said state change-over switch; and
a station selection control circuit which reads station selecting data from said two types of position memories through said memory control circuit in accordance with indication contents and outputs the station selecting data to a tuner portion.

3. A station selector according to claim 2, wherein station selecting operation is performed at a factory in a tuner portion using station selecting data which have been read from position memories exclusive for a factory.

4. A method of preparing a television for shipment from a factory to a market, said method comprising:
providing factory position memories, exclusive for said factory, in which factory station selecting data are written for determining at said factory whether a station selecting operation is performed properly;
providing market position memories, exclusive for said market, in which market station selecting data are written for selecting television broadcasting in said market;
providing a state change-over switch which changes said television between a factory state in which said television is tuned in accordance with said factory station selecting data and a shipment state in which said television is tuned in accordance with said market selecting data;
setting said state change-over switch to place said television in said factory state;
testing said television while said television is in said factory state to determine whether said station selecting operation is performed correctly; and
setting said state change-over switch to place said television in said shipment state.

* * * * *